(12) United States Patent
Joachimpillai et al.

(10) Patent No.: US 9,319,476 B2
(45) Date of Patent: Apr. 19, 2016

(54) RESILIENT TCP SPLICING FOR PROXY SERVICES

(71) Applicant: Verizon Patent and Licensing Inc., Basking Ridge, NJ (US)

(72) Inventors: Damascene Joachimpillai, Westford, MA (US); Jae Won Chung, Lexington, MA (US); Mark Richardson, Hollis, NH (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 362 days.

(21) Appl. No.: 13/903,046

(22) Filed: May 28, 2013

(65) Prior Publication Data

US 2014/0359052 A1 Dec. 4, 2014

(51) Int. Cl.
*H04L 29/08* (2006.01)
*H04L 29/06* (2006.01)
*H04L 12/24* (2006.01)

(52) U.S. Cl.
CPC .............. *H04L 67/28* (2013.01); *H04L 69/08* (2013.01); *H04L 69/16* (2013.01); *H04L 41/0293* (2013.01)

(58) Field of Classification Search
CPC ..... H04L 69/16; H04L 69/22; H04L 67/2814; H04L 12/14; H04L 69/161; H04L 67/03; H04L 69/166; H04L 67/1034; H04L 69/165; H04L 67/1023; H04L 67/1002; H04L 41/5019; H04L 47/10; H04L 45/123; H04L 63/0281; H04L 29/06; H04L 67/28; H04L 41/0293; G06F 8/61
See application file for complete search history.

(56) References Cited

U.S. PATENT DOCUMENTS

| 6,182,139 | B1 * | 1/2001 | Brendel | H04L 29/06 709/201 |
| 6,415,329 | B1 * | 7/2002 | Gelman | H04L 12/66 370/401 |
| 6,772,211 | B2 * | 8/2004 | Lu | H04L 29/06 709/223 |
| 6,788,696 | B2 * | 9/2004 | Allan | H04Q 11/0478 370/230 |
| 6,944,678 | B2 * | 9/2005 | Lu | H04L 29/06 370/355 |
| 7,000,027 | B2 * | 2/2006 | Hensbergen | H04L 29/06 709/238 |
| 7,043,632 | B2 * | 5/2006 | Chapman | H04L 63/0428 713/151 |
| 7,117,269 | B2 * | 10/2006 | Lu | H04L 29/06 370/351 |
| 7,315,896 | B2 * | 1/2008 | Van Hensbergen | H04L 41/0896 709/227 |
| 7,363,363 | B2 * | 4/2008 | Dal Canto | H04L 63/0272 379/201.04 |

(Continued)

OTHER PUBLICATIONS

Spatscheck, O., Hansen, J., Hartman, J. and Peterson, L., "Optimizing TCP Forwarder Performance," IEEE/ACM Transactions on Networking, vol. 8, No. 2, Apr. 2000, pp. 146-157.*

(Continued)

*Primary Examiner* — Jimmy H Tran

(57) ABSTRACT

A transparent proxy device includes an ingress, an egress, and an application proxy. The ingress and the egress operate up to a layer four communication layer. The transparent proxy device is configured to establish spliced connections in relation to end devices. The spliced connections include layer four connections between the ingress and the application proxy and the application proxy and the egress. The transparent proxy device is configured to maintain an end-to-end connection in relation to the end devices even when the application proxy fails.

20 Claims, 13 Drawing Sheets

(56) References Cited

U.S. PATENT DOCUMENTS

| | | | | |
|---|---|---|---|---|
| 7,437,473 | B2* | 10/2008 | Lu | H04L 29/06 709/236 |
| 7,475,154 | B2* | 1/2009 | Chetuparambil | H04L 69/16 709/203 |
| 7,809,840 | B2* | 10/2010 | Jing | H04L 12/14 709/203 |
| 7,937,490 | B2* | 5/2011 | Lu | H04L 29/06 709/235 |
| 7,984,160 | B2* | 7/2011 | Lam | H04L 63/0254 709/203 |
| 8,180,902 | B1* | 5/2012 | Day et al. | 709/227 |
| 8,203,949 | B1* | 6/2012 | Helmy et al. | 370/230 |
| 8,417,821 | B2* | 4/2013 | Jing | H04L 12/14 370/401 |
| 8,806,011 | B1* | 8/2014 | Graham-Cumming | 709/225 |
| 9,148,367 | B2* | 9/2015 | Kandaswamy | H04L 45/38 |
| 2002/0194350 | A1* | 12/2002 | Lu | H04L 29/06 709/229 |
| 2003/0101273 | A1* | 5/2003 | Hensbergen | H04L 29/06 709/232 |
| 2003/0229702 | A1* | 12/2003 | Hensbergen | H04L 41/0896 709/228 |
| 2003/0229713 | A1* | 12/2003 | Hensbergen | H04L 29/09 709/239 |
| 2004/0268175 | A1* | 12/2004 | Koch et al. | 714/4 |
| 2005/0041593 | A1* | 2/2005 | Kikuchi et al. | 370/242 |
| 2006/0029000 | A1* | 2/2006 | Waldvogel | H04L 69/16 370/254 |
| 2006/0123477 | A1* | 6/2006 | Raghavan | G06F 9/546 726/22 |
| 2006/0190609 | A1* | 8/2006 | Chetuparambil | H04L 69/16 709/228 |
| 2007/0038853 | A1* | 2/2007 | Day | H04L 63/0281 713/153 |
| 2008/0109554 | A1* | 5/2008 | Jing | H04L 12/14 709/230 |
| 2008/0235382 | A1* | 9/2008 | Marwah | H04L 69/16 709/228 |
| 2008/0263180 | A1* | 10/2008 | Hurst et al. | 709/219 |
| 2008/0320151 | A1* | 12/2008 | McCanne | H03M 7/30 709/228 |
| 2009/0059788 | A1* | 3/2009 | Granovsky et al. | 370/235 |
| 2010/0174817 | A1* | 7/2010 | Chetuparambil et al. | 709/227 |
| 2010/0228867 | A1* | 9/2010 | Lam | H04L 63/0254 709/228 |
| 2010/0318665 | A1* | 12/2010 | Demmer | H04L 41/12 709/227 |
| 2010/0325305 | A1* | 12/2010 | Jing | H04L 12/14 709/232 |
| 2013/0024523 | A1* | 1/2013 | Albasheir et al. | 709/206 |
| 2014/0092906 | A1* | 4/2014 | Kandaswamy | H04L 69/22 370/392 |

OTHER PUBLICATIONS

Cohen, Ariel, Sampath Rangarajan, and Hamilton Slye. "On the performance of TCP splicing for URL-aware redirection." Proceedings of the 2nd conference on USENIX Symposium on Internet Technologies and Systems—vol. 2. USENIX Association, 1999.*

Maltz, David, and Pravin Bhagwat. "TCP splicing for application layer proxy performance." IBM RC 21129 (1998).*

Lin, Ying-Dar, et al. "Direct web switch routing with state migration, TCP masquerade, and cookie name rewriting." Global Telecommunications Conference, 2003. GLOBECOM'03. IEEE. vol. 7. IEEE, 2003.*

Aron, Mohit, et al. "Scalable content-aware request distribution in cluster-based network servers." Proceedings of the 2000 Annual USENIX technical Conference. No. LABOS-CONF-2005-025. 2000.*

Spatscheck, Oliver, et al. "Optimizing TCP forwarder performance." IEEE/ACM Transactions on Networking (TON) 8.2 (2000): 146-157.*

Davis, Dan, and Manish Parashar. "Latency performance of SOAP implementations." Cluster Computing and the Grid, 2002. 2nd IEEE/ACM International Symposium on. IEEE, 2002.*

* cited by examiner

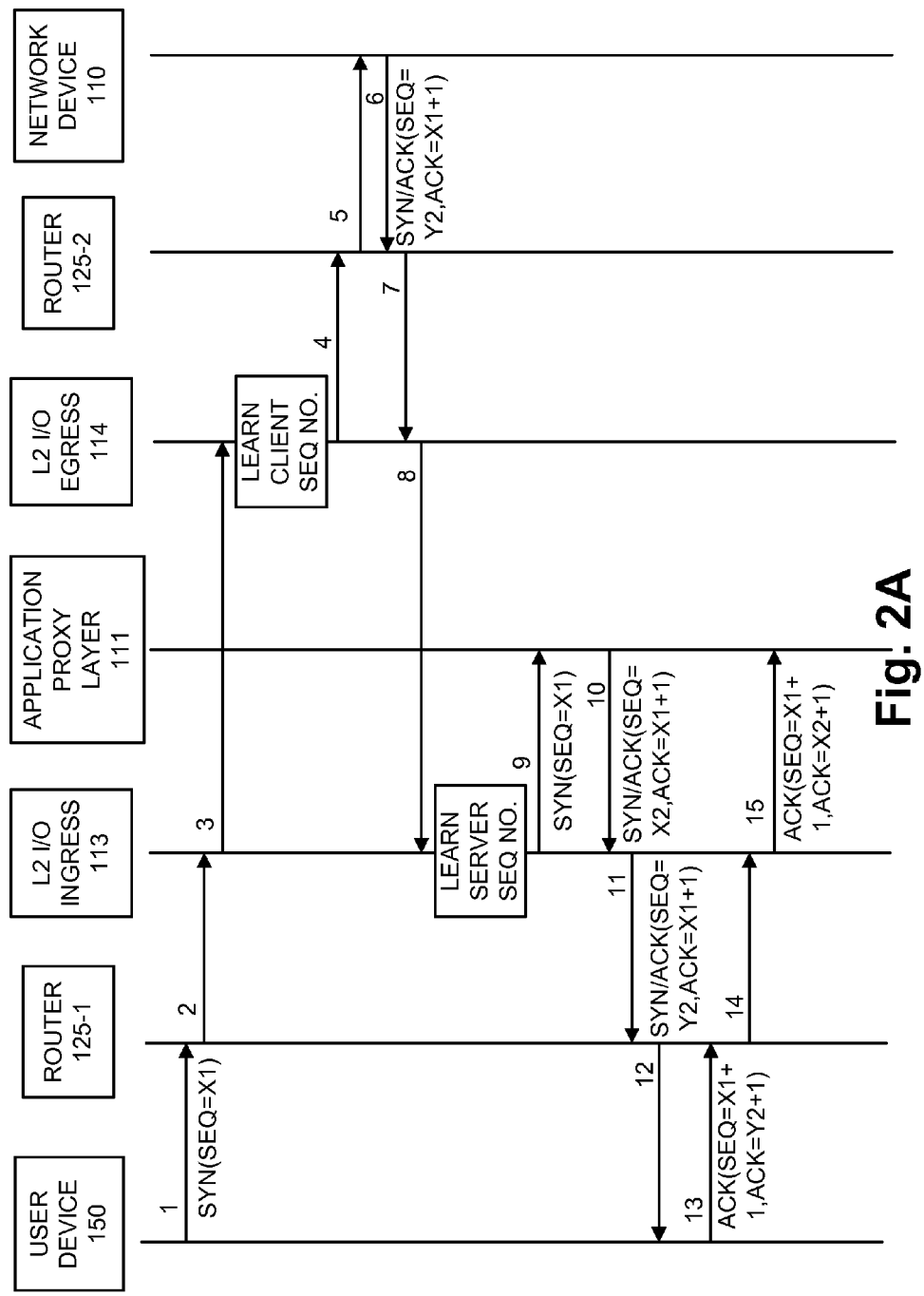

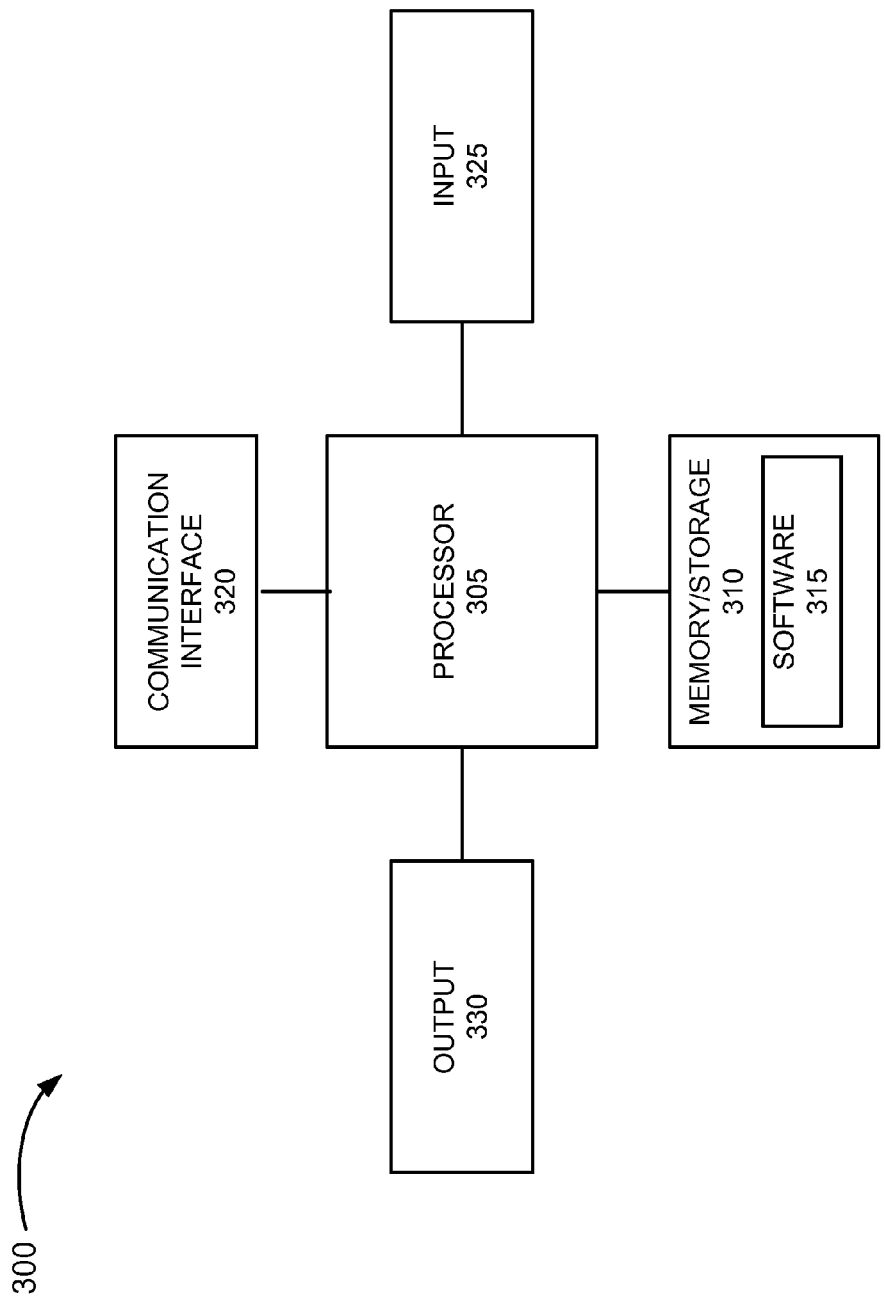

RESILIENT TCP SPLICING FOR PROXY SERVICES

BACKGROUND

Transparent application layer proxies, which terminate Transmission Control Protocol (TCP) connections, are used in the Internet for various purposes. For example, a Hypertext Transfer Protocol (HTTP) proxy or a Radio Access Network (RAN) TCP optimization proxy situated behind a RAN gateway may be implemented. In order for a proxy to be transparent, the proxy acts as a router in the network. Unfortunately, if the proxy crashes or a route to the proxy becomes unavailable due to a network failure, service disruption may occur.

BRIEF DESCRIPTION OF THE DRAWINGS

FIGS. 2A-2E are diagrams illustrating exemplary messaging flows pertaining to an exemplary embodiment of resilient TCP splicing;

FIG. 3 is a diagram illustrating exemplary components of a device that may correspond to one or more of the devices depicted in the previous figures;

DETAILED DESCRIPTION OF PREFERRED EMBODIMENTS

The following detailed description refers to the accompanying drawings. The same reference numbers in different drawings may identify the same or similar elements.

Transparent application proxies are often deployed on a network (e.g., a service, enterprise network) that implements resilient multipath network connectivity within the network to provide continuous (e.g., 24 hours, 7 days a week) access and availability to the proxy services. Unfortunately, irrespective of alternate network paths, end-users may experience an interruption of a proxy service when a proxy crashes or the proxy is not accessible due to a network failure. As a result, end-users may experience a service disruption.

As described herein, a resilient TCP splicing mechanism is introduced. The resilient TCP splicing mechanism may avoid end-to-end TCP connection failures to a service even when a proxy or a route to the proxy becomes unavailable.

According to an exemplary embodiment, the resilient TCP splicing mechanism includes a transparent proxy. For example, in a client-server architecture, the transparent proxy is situated between a client (e.g., a user device) and a server (e.g., a network device).

According to an exemplary embodiment, the transparent proxy manages the establishment of end-to-end TCP connections, as described herein. According to an exemplary embodiment, the resilient TCP splicing mechanism includes various conditions that are satisfied. For example, a first condition includes that, in one embodiment, the TCP options negotiated during a three-way handshake be the same for a first-side (e.g., a client-side) TCP connection and a second-side (e.g., a server-side) TCP connection. Additionally, for example, a second condition includes that the TCP window sequence numbers of the first-side TCP connection and the second-side TCP connection, in one embodiment, are in sync. Additionally, for example, a third condition includes that, in one embodiment, a TCP sender shall not be acknowledged for payload (data) until the TCP receiver receives the payload data. As described and illustrated further below, from the transparent proxy perspective, once a first-side TCP connection is established and a second-side TCP connection is established, if a failure occurs (e.g., transparent proxy failure or a route failure to/from the transparent proxy), an end-to-end connection between a first end device and a second end device may continue without a loss in service.

While exemplary embodiments provided in this description may be implemented based on the use of a particular protocol, network architecture, platform, etc., such implementations are not intended to be restrictive or provide an exhaustive treatment, as such. In other words, the embodiments described herein may be implemented using other suitable protocols, network architectures, platforms, etc., which may not be specifically described.

Figure 1A:
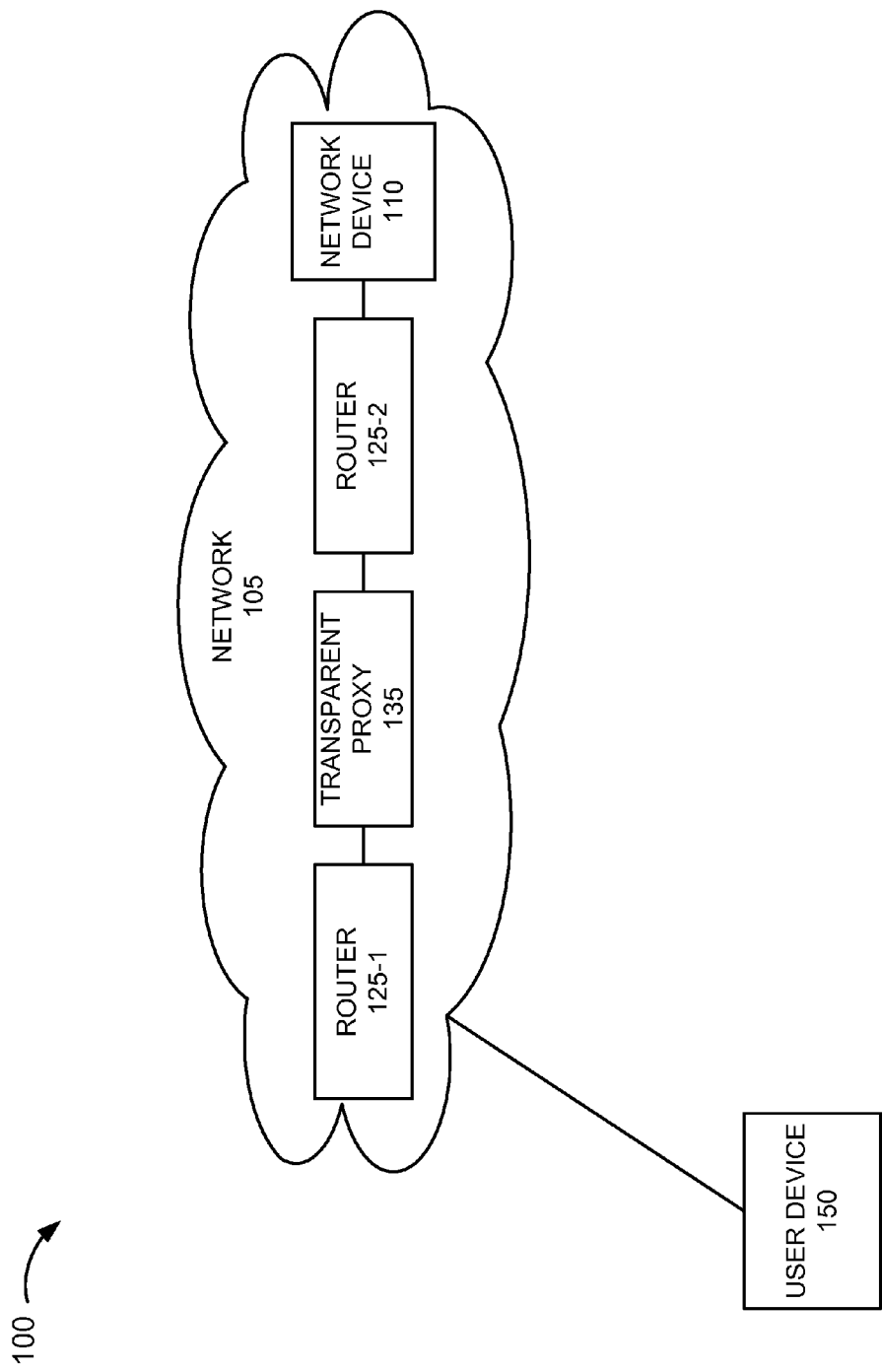
FIG. 1A is a diagram illustrating an exemplary environment in which an exemplary embodiment of resilient TCP splicing for proxy service may be implemented.

FIG. 1A is a diagram illustrating an exemplary environment in which an exemplary embodiment of resilient TCP splicing for proxy service may be implemented. As illustrated, an environment 100 includes a network 105 that includes a network device 110. Environment 100 also includes routers 125-1 and 125-2 (also referred to individually as router 125 or collectively as routers 125), a transparent proxy 135, and a user device 150.

The number of devices, the number of networks, and the configuration in environment 100 are exemplary. According to other embodiments, environment 100 may include additional devices, fewer devices, different devices, and/or differently arranged devices, than those illustrated in FIG. 1A. For example, network 105 may include various other network devices, such as, one or multiple security devices, gateways, access points, billing devices, etc.

Additionally, or alternatively, environment 100 may include an additional network and/or a differently arranged network, than illustrated in FIG. 1A. For example, environment 100 may include an access network, an enterprise network, etc. A device may be implemented according to one or multiple network architectures (e.g., a client device, a server device, a peer device, a proxy device, or some combination thereof).

Also, according to other embodiments, one or more functions and/or processes described as being performed by a particular device may be performed by a different device, or some combination of devices, which may or may not include the particular device.

Environment 100 may be implemented to include wired and/or wireless connections among the devices and network illustrated. A connection may be direct or indirect and may involve intermediary device(s) and/or network(s) not illustrated in FIG. 1A. Additionally, the number and the arrangement of connections between the devices and the network are exemplary.

Network 105 includes one or multiple networks of one or multiple types. For example, network 105 may include the Internet, a wide area network, a private network, a public network, an intranet, an enterprise network, a local area network, a packet-switched network, a wired network (e.g., an optical network, a cable network, etc.), a wireless network (e.g., a mobile network, a cellular network, a non-cellular network, etc.), a cloud network, a data network, a computer network, etc. Network 105 may operate according to various protocols. According to an exemplary implementation, network 105 operates according to the TCP.

Network device 110 includes a network element (e.g., logic) that provides a service or an asset. For example, the service may be a video streaming service, a file transfer service, or a Web service, or any other type of service. Network device 110 may be implemented as, for example, a cloud device, an application server device, a web server device, a media device, or some combination thereof. Router 125 includes a routing element that receives packets and transmits the packets toward their destination.

Transparent proxy 135 includes an application layer proxy. According to an exemplary embodiment, transparent proxy 135 provides for TCP splicing. For example, a TCP connection is split between end devices, such as a client device and a server device. In contrast to well-known application layer proxies, transparent proxy 135 includes resilient TCP splicing for proxy service functionality, as described herein. Transparent proxy 135 may be implemented as, for example, a web proxy device, a media proxy device (e.g., audio and/or video, etc.), a security device (e.g., a firewall, an intrusion detection system (IDS), etc.), a gateway device, or other network element in which a proxy service is provided. Transparent proxy 135 is described further below.

User device 150 includes an end device. For example, user device 150 may be implemented as a mobile device (e.g., a smartphone, a tablet, a netbook, etc.), a computer (e.g., a desktop computer, a laptop computer, etc.), or a communication system in a vehicle. User device 150 may be operated by a user or user device 150 may be automated for machine-to-machine communication with network device 110. User device 150 may include software (e.g., a client application, etc.). User device 150 is capable of communicating with network device 110 via transparent proxy 135.

Figure 1B:
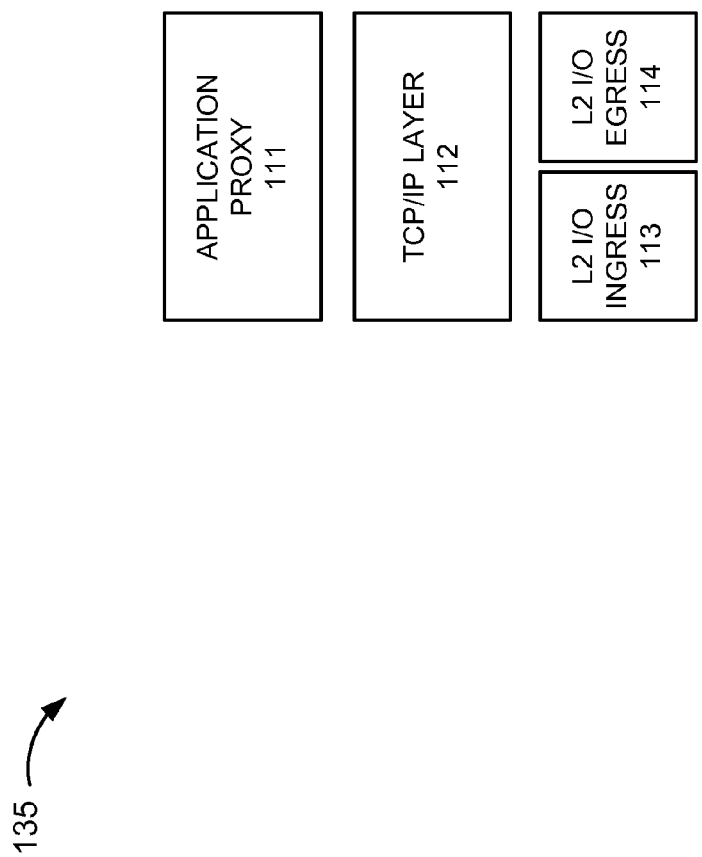
FIG. 1B is a diagram illustrating exemplary elements of a transparent proxy depicted in FIG. 1A.

FIG. 1B is a diagram illustrating exemplary elements (e.g., logic) for the transparent proxy illustrated in FIG. 1A. As illustrated, transparent proxy 135 includes an application proxy 111, a TCP/Internet Protocol (IP) layer 112, a Layer 2 input/output (I/O) ingress 113, and a Layer 2 I/O egress 114.

Application proxy 111 includes an element that provides a proxy service at the application layer. For example, depending on the application, the proxy service may be media-related (e.g., transcoding, etc.), such as a media proxy or web-related (e.g., content filtering, logging, etc.), such as a web proxy. According to an exemplary implementation, application proxy 111 is a transparent proxy. Applicant proxy 111 provides resilient TCP splicing, as described herein.

TCP/IP layer 112 includes the communication protocols of a TCP/IP stack (e.g., TCP, IP, and the lower layers). Layer 2 I/O ingress 113 and Layer 2 I/O egress 114 each include an element to transmit and receive packets. The term "packet," as used herein, is intended to be broadly interpreted to include a data transmission or a communication, the packaging of which may correspond to, for example, a packet, a cell, a frame, a datagram, some other type of container or unit of data, and/or a fragment thereof. Layer 2 I/O ingress 113 and Layer 2 I/O egress 114 each includes a transmitter and a receiver, or a transceiver. Layer 2 I/O ingress 113 and Layer 2 I/O egress 114 provide routing and packet processing services. Layer 2 I/O ingress 113 and Layer 2 I/O egress 114 may each be implemented as a line card. Layer 2 I/O ingress 113 and Layer 2 I/O egress 114 may each include a network processing unit (NPU) or other suitable processor (e.g., a microprocessor, etc.). Layer 2 I/O ingress 113 and Layer 2 I/O egress 114 each provides resilient TCP splicing, as described herein.

Layer 2 I/O ingress 113 and Layer 2 I/O egress 114 may each operate at communication layers below the application layer. For example, Layer 2 I/O ingress 113 and Layer 2 I/O egress 114 may operate at layer one (e.g., physical layer), Layer 2 (e.g., link layer), and layers 3 and 4 (e.g., TCP and IP). In this regard, Layer 2 I/O ingress 113 and Layer 2 I/O egress 114 may be capable of establishing TCP connections with end devices (e.g., user device 150, network device 110) and other elements (e.g., application proxy layer 111). Stated differently, Layer 2 I/O ingress 113 and Layer 2 I/O egress 114 may have layer 3 (e.g. network layer) and layer 4 (e.g., transport layer) functionalities, at least with respect to connection establishment. However, according to some exemplary implementations, Layer 2 I/O ingress 113 and Layer 2 I/O egress 114 may not offer the full range of layer 4 functionality (e.g., condition control, window management, etc.). In one embodiment, Layer 2 I/O ingress 113, layer 2 I/O egress 114, and/or router 125-1 may provide Network Address Translation (NAT) to deliver packets between user device 150 and network device 110.

FIGS. 2A-2E are diagrams illustrating an exemplary messaging flow for providing resilient TCP splicing for a proxy service. The messaging flow is described in relation to the elements illustrated in the previous figures.

Under the TCP, a TCP three-way handshake is a method used by the TCP to set up a TCP/IP connection over an IP-based network. The TCP three-way handshake uses three message types, namely a synchronize (SYN) message, a synchronize-acknowledgement (SYN-ACK) message, and an acknowledgement message. During the TCP three-way handshake, sequence numbers and TCP options are negotiated between the end devices (e.g., user device 150 and network device 110).

Referring to FIG. 2A, it may be assumed that user device 150 initiates a connection to network device 110. It may be further assumed that user device 150 includes a client component. As illustrated, in message (1), user device 150 transmits a SYN message that indicates an initial sequence number (ISN) of X1. The SYN message also indicates TCP options (not illustrated). Router 125-1 receives the SYN message. By way of example, router 125-1 is configured to transmit messages to L2 I/O ingress 113 of transparent proxy 135. Alternatively, router 125-1 performs a lookup that results in router 125-1 transmitting the SYN message to L2 I/O ingress 113, as illustrated by message (2). L2 I/O ingress 113 receives the SYN message. L2 I/O ingress 113 stores data of the SYN message (e.g., the initial sequence number) and transmits the SYN message to L2 I/O egress 114, as illustrated by message (3). In this regard, message (3) bypasses application proxy layer 111. Based on message (3) and a flow table, for example, L2 I/O ingress 113 identifies that message (3) includes an unrecognized 5-tuple and that message (3) is a SYN message. L2 I/O egress 114 transmits message to router 125-2 (message 4), which in turn is transmitted to network device 110, by router 125-2, as message (5). It may be assumed that network device 110 includes a server component. As illustrated, L2 I/O egress 114 learns the initial sequence number (e.g., X1) used by user device 150 (e.g., client). Network device 110 receives message (5).

In response to receiving message (5), network device 110 transmits a SYN-ACK message (message 6). The SYN-ACK message includes the server-side initial sequence number (e.g., Y2) and an acknowledgment. The SYN-ACK message also includes TCP options supported by network device 110. The SYN-ACK message is transmitted to L2 I/O egress 113 via router 125-2 and L2 I/O egress 114 in messages (7) and (8). Since the SYN-ACK is a response to the SYN, and the SYN was received from L2 I/O ingress 113, L2 I/O egress 114 transmits the SYN-ACK directly to L2 I/O ingress 113 (i.e., bypassing application proxy layer 111).

L2 I/O ingress 113 receives the SYN-ACK message. In symmetric fashion, L2 I/O ingress 113 learns the initial sequence number (e.g., Y2) used by network device 110. L2 I/O ingress 113 uses the stored data of the SYN message received from user device 150 and generates a SYN message. L2 I/O ingress 113 transmits a SYN message to application proxy layer 111 (message 9), which includes the initial sequence number (e.g., X1). In this regard, L2 I/O ingress 113 plays the client role relative to application proxy layer 111. Application proxy layer 111 receives the SYN message, and in response transmits a SYN-ACK message (message 10) to L2 I/O ingress 113. The SYN-ACK message includes an initial sequence number (e.g., X2) for establishing a client-side TCP connection of a TCP spliced connection. L2 I/O ingress 113 may store the initial sequence number (e.g. X2). In response to receiving message (10), L2 I/O ingress 113 transmits a SYN-ACK message (message 11) to router 125-1. The SYN-ACK message includes the initial sequence number (e.g., Y2) of network device 110, which is learned from message (8) and the acknowledgement from network device 110 to user device 150 for message (1). That is, message (11) is based on or essentially message (6). Router 125-1 transmits the SYN-ACK message to user device 150 as message (12). User device 150 receives the SYN-ACK message. In this embodiment, L2 I/O ingress 113 may calculate a proxy-to-server sequence number delta that is equal to Y2-X2. Also, L2 I/O ingress 113 may update its flow tables to account for the flow of packets between user device 150 and network device 110. The flow may be defined by IP addresses and port numbers, for example. In one embodiment, L2 I/O egress 114 may update its flow table to accurately reflect the flow between devices when message 2 is received.

In response to receiving the SYN-ACK message, user device 150 transmits an ACK message (message 13) to router 125-1. The ACK message includes a next sequence number (e.g., X1+1) and an acknowledgement. Router 125-1 receives the ACK message and transmits the ACK message (message 14) to L2 I/O ingress 113. L2 I/O ingress 113 receives the ACK message and, in response thereto, transmits an ACK message (message 15) to application proxy layer 111. In this example, L2 I/O ingress 113 may check its flow table to determine that a flow exists and, as a result, L2 I/O ingress 113 sends message 15 to application proxy layer 111 (e.g., rather than L2 I/O egress 114 (e.g., as with message 3 above). The ACK message includes the next sequence number of message (13) (i.e., X1+1) and an acknowledgment of the SYN portion of message (10) (i.e., X2+1). Application proxy layer 111 receives the ACK message.

Figure 2B:
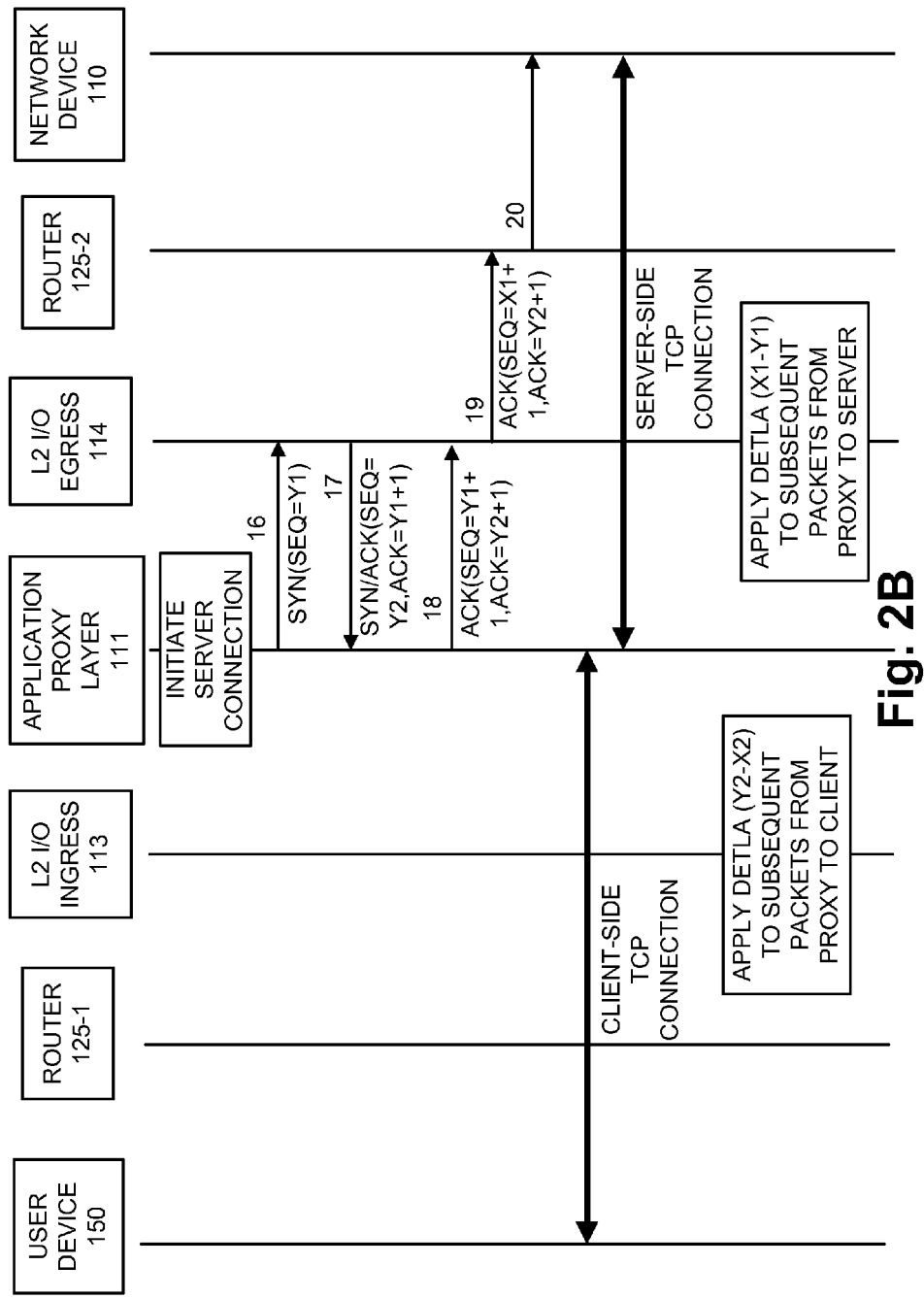

Referring to FIG. 2B, in response receiving the ACK message, application proxy layer 111 initiates a server-side TCP connection with network device 110. As illustrated, application proxy layer 111 transmits a SYN message (message 16) to L2 I/O egress 114. The SYN message includes a server-side initial sequence number (e.g., Y1). L2 I/O egress 114 receives the SYN message. In response, L2 I/O egress 114 transmits a SYN-ACK message (message 17) to application proxy layer 111. The SYN-ACK message includes the initial sequence number of SYN-ACK message (6) from network device 110 and an acknowledgement of SYN message (16). Application proxy layer 111 receives the SYN-ACK message.

In response to receiving the SYN-ACK message, application proxy layer 111 transmits an ACK message (message 18) to L2 I/O egress 114. The ACK message includes the next sequence number (e.g., Y1+1) and an acknowledgement to SYN-ACK message (6) from network device 110. L2 I/O egress 114 receives the ACK message. In response, L2 I/O egress 114 transmits an ACK message (message 19) to router 125-2. The ACK message includes the next sequence number (e.g., X1+1) included in message (13) and the acknowledgement to message (6). Router 125-2 transmits the ACK message (message 20) to network device 110. Network device 110 receives the ACK message. As illustrated, a TCP spliced connection that includes a client-side TCP connection and a server-side TCP connection is established between application proxy layer 111 and user device 150 and network device 110. In this embodiment, L2 I/O egress 114 may calculate a proxy-to-server sequence number delta that is equal to X1-Y1 (e.g., I/O egress 114 may know both X1 and Y1).

As previously explained, according to an exemplary embodiment, the resilient TCP splicing mechanism includes various conditions that are satisfied. For example, in view of the message flow described, a first condition is satisfied in that user device 150 and network device 110 negotiated TCP options during the 3-way handshake. For example, the L2 I/O subsystem replays the TCP option negotiation during the server-side 3-way handshake initiated by the proxy instance. According to this example, the TCP options are supported by the proxy-side TCP stacks and enabled. Additionally, in this example, a second condition is satisfied in that the L2 I/O subsystem may store an initial sequence number delta of proxy-to-server and proxy-to-client TCP connections during the handshake. The L2 I/O subsystem may adjust the sequence numbers of packets, subsequently transmitted via the proxy-to-client and proxy-to-server TCP connections, based on the delta value.

Layer 2 I/O ingress 113 and Layer 2 I/O egress 114 may have layer 3 and layer 4 functionalities, at least with respect to connection establishment. That is, Layer 2 I/O ingress 113 and Layer 2 I/O egress 114 are capable of establishing a TCP connection with application proxy layer 111, network device 110, and/or user device 150. In this regard, Layer 2 I/O ingress 113 and Layer 2 I/O egress 114 may support different roles in relation to these other elements. For example, referring back to FIG. 2A, when Layer 2 I/O ingress 113 receives the ACK message (message 14), a TCP connection is established between user device 150 and Layer 2 I/O ingress 113. In terms of roles, Layer 2 I/O ingress 113 may have a server role relative to the client of user device 150. That is, the client of user device 150 may consider Layer 2 I/O ingress 113 as the server of network device 110. Additionally, when application proxy layer 111 receives the ACK message (message 15), a TCP connection is established between Layer 2 I/O ingress 113 and application proxy layer 111. In terms of roles, Layer 2 I/O ingress 113 may have a client role relative to application proxy layer 111. In other words, application proxy layer 111 may consider L2 I/O ingress 113 as the client, agent, or proxy of user device 150. These different roles also apply to Layer 2 I/O egress 114. For example, referring to FIG. 2B, when Layer 2 I/O egress 114 receives the ACK message (message 18), a TCP connection is established between application proxy layer 111 and Layer 2 I/O egress 114. In terms of roles, Layer 2 I/O egress 114 may have a server role relative to application proxy layer 111. In other words, application proxy layer 111 may consider L2 I/O egress 114 as the server of network device 110. Additionally, L2 I/O egress 114 may have a client role relative to network device 110. In other words, the server of network device 110 may consider Layer 2 I/O egress as the client, agent, or proxy of user device 150.

Figure 2C:
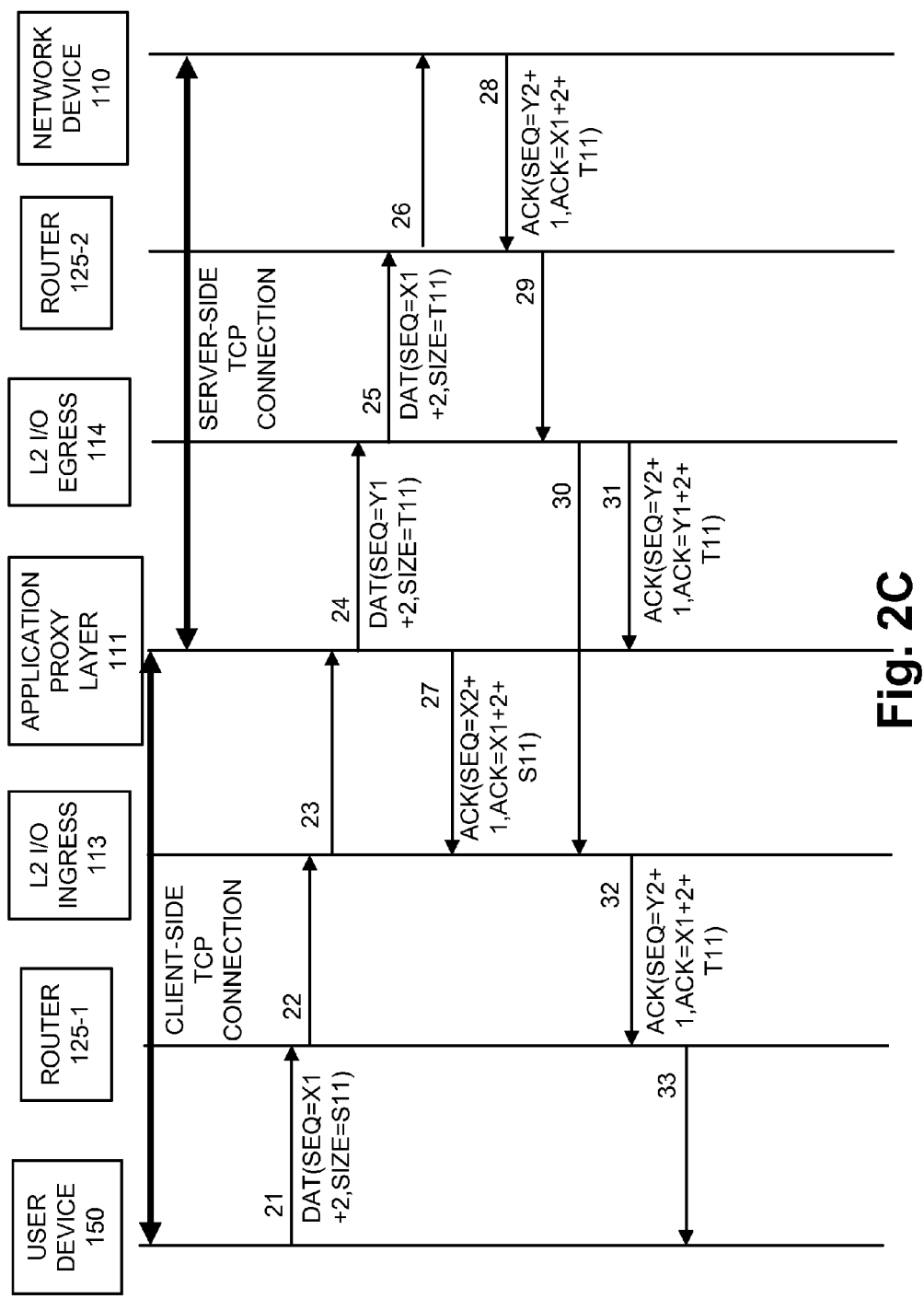

FIG. 2C illustrates an exemplary message flow after the client-side and server-side TCP connections have been established. For example, user device 150 begins transmitting a payload (data) to network device 110. Referring to FIG. 2C, user device 150 transmits a data (DAT) message (message 21) that includes a sequence number, a size, and a payload. The DAT message is forwarded to application proxy layer 111 in messages (22) and (23). In response to receiving the DAT message, application proxy layer 111 transmits a DAT message (message 24) to L2 I/O egress 114. The DAT message includes a sequence number, a size, and a payload according to the TCP connection established between application proxy layer 111 and L2 I/O egress 114. For example, application proxy layer 111 uses its own, server-side sequence number. Additionally, application proxy layer 111 uses its own size (e.g., T11). L2 I/O egress 114 receives the DAT message.

L2 I/O egress 114 transmits a DAT message (message 25) to router 125-2. The DAT message includes the sequence number of message (21) (e.g., L2 I/O egress 114 may use the proxy-to-server delta to determine the appropriate sequence number). Router 125-2 receives the DAT message and transmits the DAT message (message 26) to network device 110. In response to receiving message (23), application proxy layer 111 transmits an ACK message (message 27) to L2 I/O ingress 113. The ACK message includes a sequence number, an acknowledgement for message (21). Referring to network device 110, in response to receiving the DAT message (message 26), network device 110 transmits an ACK message (message 28) to router 125-2. The ACK message includes a sequence number, an acknowledgement to message (26). Router 125-2 transmits the ACK message (message 29) to L2 I/O egress 114 and in turn, L2 I/O egress 114 transmits the ACK message (message 30) to L2 I/O ingress 113. L2 I/O egress 114 also transmits an ACK message (message 31) to application proxy layer 111. The ACK message (message 31) includes the sequence number of message 28 and an acknowledgement to message 24. L2 I/O ingress 113, having received ACK message 27 and ACK message 30 may determine any size difference between DAT message 21 (e.g., size S11) and DAT message 24 (e.g., size T11). The sizes should, in one embodiment, be the same too keep sequence numbers of the client-side and the server-side connections in sync. In response to receiving message 30, L2 I/O ingress 113 transmits an ACK message 32 to router 125-1. The ACK message includes the sequence number of message 28 and an acknowledgement to message 21. Router 125-1 receives the ACK message and transmits the ACK message (message 33) to user device 150.

As previously explained, according to an exemplary embodiment, the resilient TCP splicing mechanism may include various conditions that may be satisfied. For example, in view of the message flow described, a third condition may be satisfied in that the L2 I/O subsystem may suppress transmitting the proxy initiated ACK to the data originator (e.g., user device 150) until an ACK is received from the data receiver (network device 110). For example, in one embodiment, L2 I/O ingress 113 may refrain from transmitting an ACK to user device 150 until after the appropriate ACK is received by L2 I/O egress 114 from network device 114. Thereafter, the L2 I/O subsystem sends the ACK for the data received by the data receiver to the data originator. In this way, the resilient TCP splicing mechanism may, in one embodiment, guarantee that the originator is not acknowledged for the payload (data) until the destination receives the payload. Although not illustrated in FIG. 2C, the L2 I/O subsystem may perform ACK compression to optimize the TCP acknowledgement behavior.

Figure 2D:
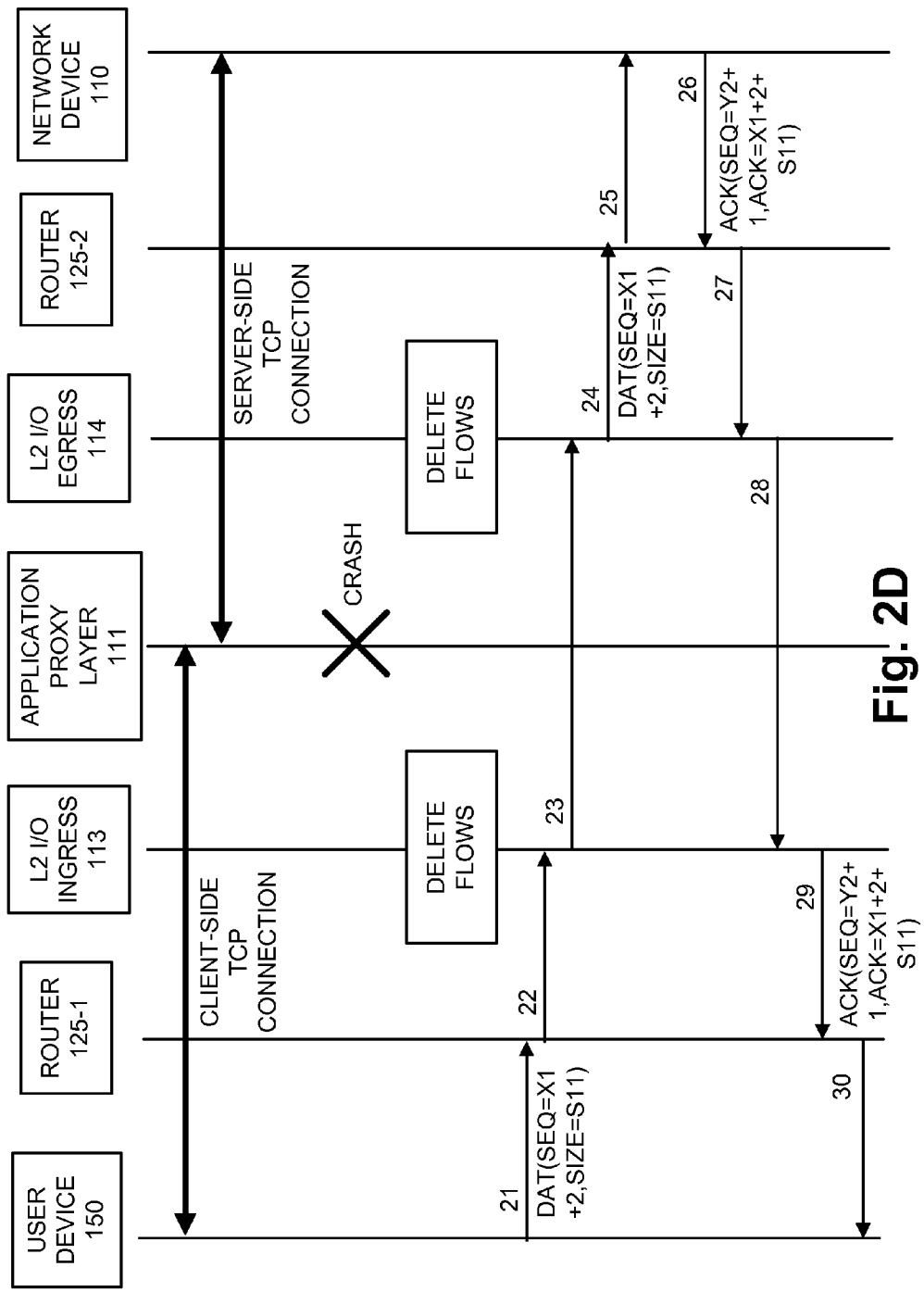
Figure 2E:
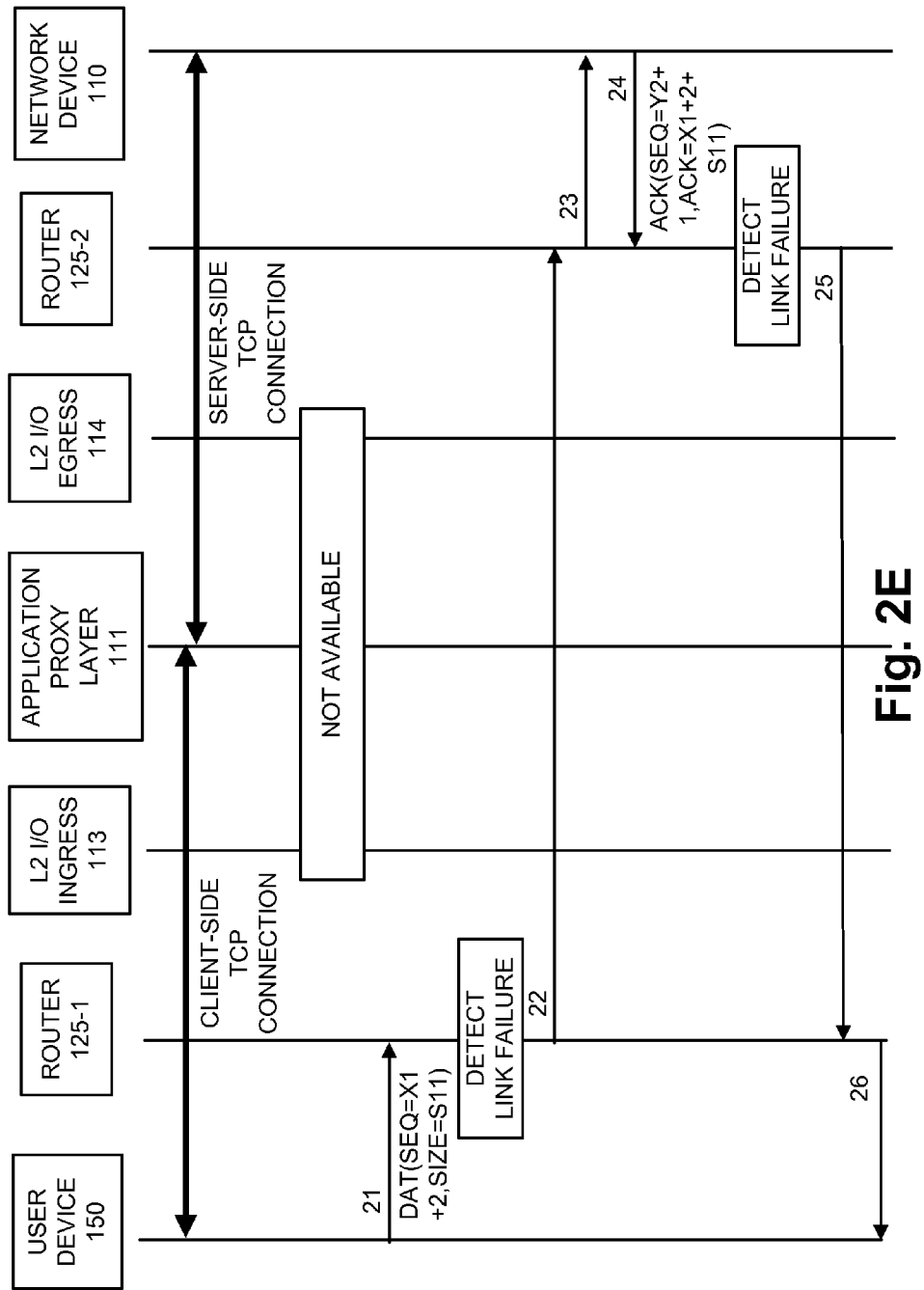

FIGS. 2D and 2E illustrate exemplary scenarios when a failure occurs. For example, in FIG. 2D, application proxy layer 111 crashes, but the L2 I/O subsystem is still available. In FIG. 2E, transparent proxy 135 is completely unavailable.

Referring to FIG. 2D, assume that application proxy layer 111 crashes. L2 I/O ingress 113 and L2 I/O egress 114 detect that application proxy layer 111 is unavailable. In one embodiment, application proxy layer 111 may send a notification to ingress 113 and egress 114 of a problem. In response, L2 I/O ingress 113 and L2 I/O egress 114 may delete flows serviced by application proxy layer 111. For example, L2 I/O ingress 113 and L2 I/O egress 114 may each delete traffic flow information from a flow table as it pertains to proxy layer 111. The traffic flow information pertains to traffic to and from user device 150 and network device 110 via transparent proxy 135. In this way, L2 I/O ingress 113 and L2 IO egress 114 behave similarly as described above in the description of FIG. 2A by bypassing proxy layer 111 (e.g., message 3).

As illustrated, user device 150 transmits a DAT message (message 21) to router 125-1. When L2 I/O ingress 113 receives a DAT message (message 22) from router 125-1, L2 I/O ingress 113 transmits the DAT message to L2 I/O egress 114 (e.g., there is no identified flow in the flow table corresponding to proxy layer 111). L2 I/O egress 114 transmits the DAT message (message 24) to router 125-2, and in turn, router 125-2 transmits a DAT message (message 25) to network device 110. In response, network device 110 transmits an ACK message (message 26) to router 125-2, which in turn, is transmitted and received by user device 150 via L2 I/O egress 114, L2 I/O ingress 113, and router 125-1 as shown by messages (27-30). As illustrated, in a similar fashion, L2 I/O egress 114 transmits the ACK message to L2 I/O ingress 113 and bypasses application proxy layer 111 (e.g., because there is no corresponding flow in the flow table). As a result, the end-to-end connection and service between user device 150 and network 110 is not disrupted.

Referring to FIG. 2E, assume that transparent proxy 135 is completely unavailable. As illustrated, user device 150 transmits a DAT message (message 21) to router 125-1. It may be assumed that router 125-1 has detected a link failure to transparent proxy 135 (e.g., L2 I/O ingress 113, etc.). In response to receiving the DAT message and detecting the link failure, router 125-1 transmits the DAT message (message 22) to router 125-2. Router 125-2 receives the DAT message and transmits a DAT message (message 23) to network device 110. In response to receiving the DAT message, network device 110 transmits an ACK message (message 24) to router 125-2. Router 125-2 detects the link failure, and transmits an ACK message (message 25) to router 125-1, which in turn transmits an ACK message (message 26) to user device 150. As a result, the end-to-end connection and service between user device 150 and network 110 is not disrupted.

While FIGS. 2A-2E are diagrams illustrating an exemplary process performed by an exemplary embodiment of automation system 145, according to other use case scenarios, the step(s) or act(s) described may be different.

The resilient TCP splicing mechanism may be extended to support data addition to a TCP flow by implementing added data detection/accounting mechanisms into the L2 I/O subsystem and adjusting the TCP sequence number deltas accordingly. For example, a Hypertext Transfer Protocol (HTTP) proxy service may be used to add a header to HTTP requests to help content providers to profile the server access characteristics. By adding the extra TCP state information into the L2 I/O subsystem, the extended TCP splicing mechanism may provide local resiliency (e.g., being able to recover a proxied TCP connection when the proxy instance crashes). However, a global resiliency may be more difficult (e.g., being able to recover from the transparent proxy failure or a route failure) because the extra TCP state information in the L2 I/O subsystem may be lost or inaccessible.

FIG. 3 is a diagram illustrating exemplary components of a device 300 that may correspond to one or more of the devices depicted in the previous figures. For example, device 300 may correspond to components of user device 150, network device 110, routers 125, and transparent proxy 135. As illustrated, according to an exemplary embodiment, device 300 includes a processor 305, memory/storage 310, software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 305 may be implemented as hardware (e.g., a microprocessor, etc.) or a combination of hardware and software (e.g., a SoC, an ASIC, etc.). Processor 305 may include one or multiple memories (e.g., memory/storage 310), etc.

Processor 305 may control the overall operation, or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., another device, a network, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 310 may include a hard disk (e.g., a magnetic disk, an optical disk, a magneto-optic disk, a solid state disk, etc.) and a corresponding drive. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 310 may store data, software, and/or instructions related to the operation of device 300.

Software 315 includes an operating system, an application or a program that provides a function and/or a process. Software 315 may include firmware. For example, with reference to transparent proxy 135, software 315 may include an application that, when executed by processor 305, provides the functions of the resilient TCP splicing mechanism.

Communication interface 320 permits device 300 to communicate with other devices, networks, systems and/or the like. Communication interface 320 includes one or multiple wireless interface(s) and/or wired interface(s). For example, communication interface 320 may include one or multiple transmitter(s) and receiver(s), or transceiver(s). Communication interface 320 may also support various communication protocols, communication standards, etc.

Input 325 provides an input into device 300. For example, input 325 may include a keyboard, a keypad, a touchscreen, a touch pad, a touchless screen, a mouse, an input port, a button, a switch, a microphone, a knob, and/or some other type of input.

Output 330 provides an output from device 300. For example, output 330 may include a display, a speaker, a light (e.g., light emitting diode(s), etc.), an output port, a vibratory mechanism, and/or some other type of output.

Device 300 may perform a function or a process in response to processor 305 executing software instructions stored by memory/storage 310. For example, the software instructions may be stored in memory/storage 310 based on a loading from another memory/storage 310 of device 300 or stored into memory/storage 310 based on a loading from another device via communication interface 320. The software instructions stored in memory/storage 310 may cause processor 305 to perform processes described herein. Alternatively, according to another implementation, device 300 may perform a process or a function based on the execution of hardware (e.g., processor 305, etc.).

Figure 4A:
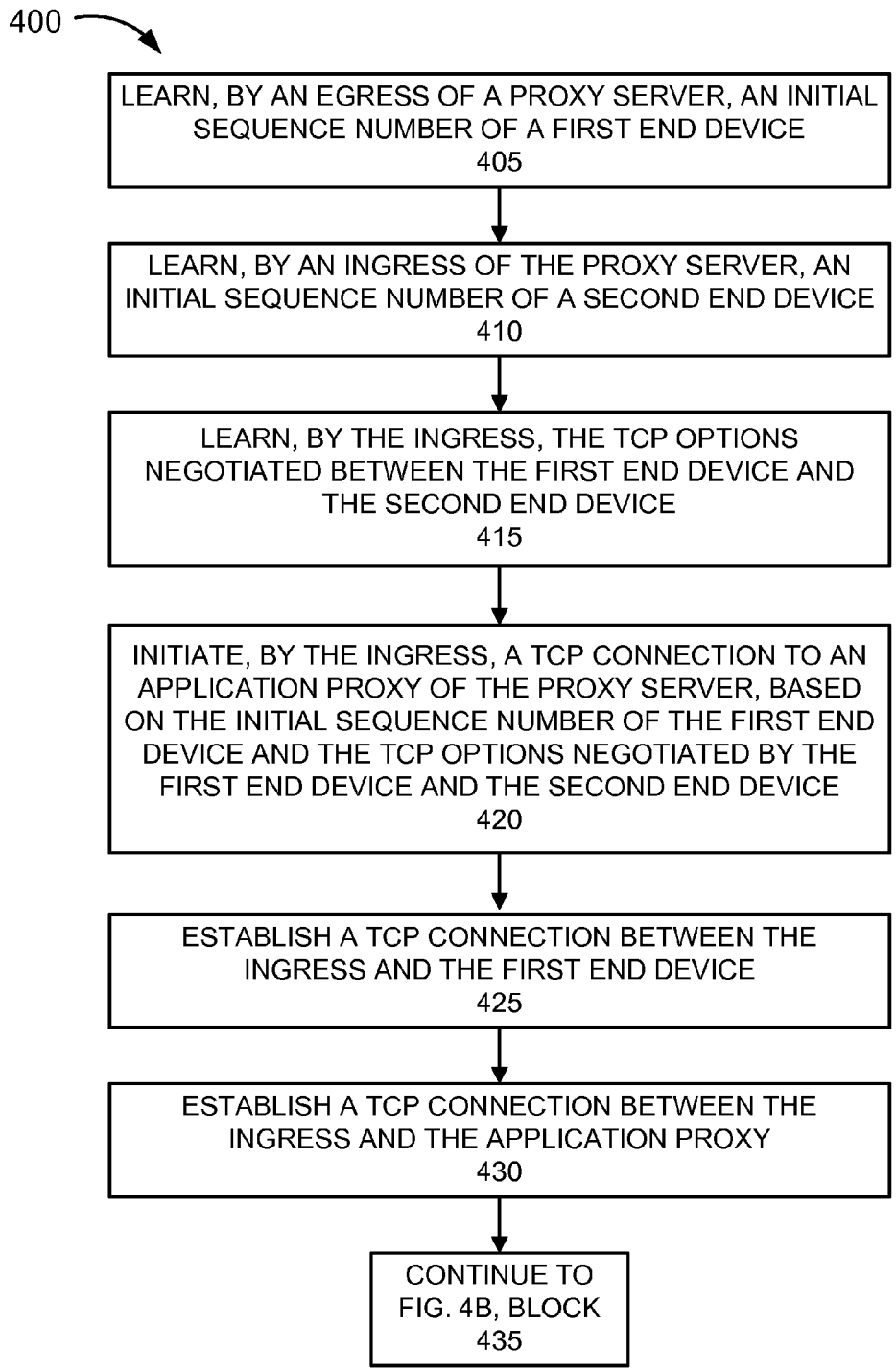
FIGS. 4A and 4B are flow diagrams illustrating an exemplary process pertaining to an exemplary embodiment of the resilient TCP splicing for a proxy service.
Figure 4B:
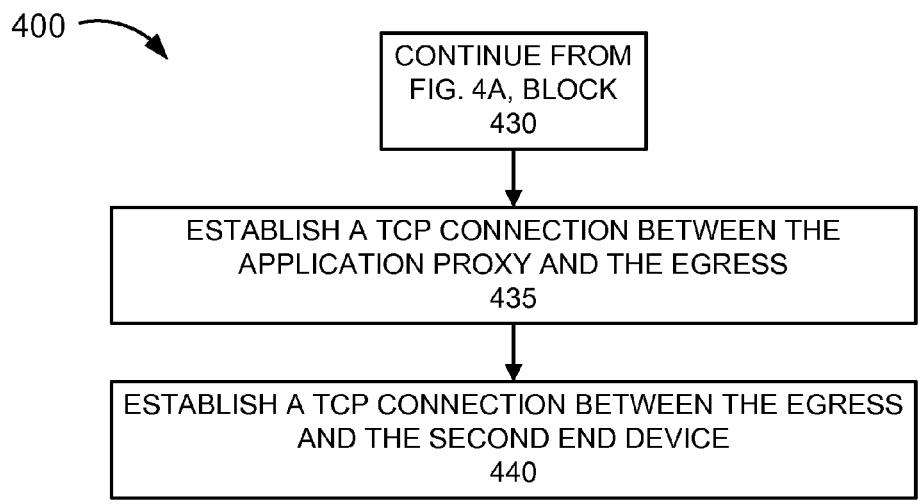

FIGS. 4A and 4B are flow diagrams illustrating an exemplary process 400 pertaining to an exemplary embodiment of the resilient TCP splicing for a proxy service. For example, process 400 pertains to the establishment of TCP connections with transparent proxy 135. A step described in process 400 is performed by one or more of the devices illustrated in FIG. 1A. For example, the device may correspond to transparent proxy 135. The description of process 400 refers to previous figures.

Referring to FIG. 4A, in block 405, process 400 begins with learning an initial sequence number of a first end device, by an egress of a proxy server. For example, L2 I/O egress 114 of transparent proxy 135 learns and stores the initial sequence number of a SYN message transmitted by user device 150, as previously described and illustrated in relation to FIG. 2A. L2 I/O ingress 113 also learns and stores the initial sequence number of the SYN message.

In block 410, an initial sequence number of a second end device is learned, by an ingress of the proxy server. For example, L2 I/O ingress 113 of transparent proxy 135 learns and stores the initial sequence number of a SYN/ACK message transmitted by network device 110, as previously described and illustrated in relation to FIG. 2A.

In block 415, TCP options negotiated between the first end device and the second end device are learned by the ingress. For example, L2 I/O ingress 113 learns and stores TCP options negotiated between user device 150 and network device 110, as previously described in relation to FIG. 2A.

In block 420, a TCP connection to an application proxy of the proxy server is initiated by the ingress, based on the initial sequence number of the first end device and the TCP options negotiated. For example, L2 I/O ingress 113 initiates a TCP connection with application proxy layer 111 of transparent proxy 135 using a SYN message. The SYN message includes the initial sequence number of user device 150 and the negotiated TCP options.

In block 425, a TCP connection between the ingress and the first end device is established. For example, L2 I/O ingress 113 establishes a TCP connection with user device 150, as illustrated by messages (11-14) of FIG. 2A. As previously described, L2 I/O ingress 113 uses the initial sequence number of message (6).

In block 430, a TCP connection between the ingress and the application proxy is established. For example, L2 I/O ingress 113 establishes a TCP connection with application proxy layer 111, as previously described and illustrated by message (15) of FIG. 2A.

Referring to FIG. 4B, in block 435, a TCP connection between the application proxy and the egress is established. For example, application proxy layer 111 establishes a TCP connection with and L2 I/O egress 114, as previously described and illustrated by messages (16-18) of FIG. 2B.

In block 440, a TCP connection between the egress and the second end device is established. For example, L2 I/O egress 114 establishes a TCP connection with network device 110 in response to establishing the TCP connection with application proxy layer 111, as previously described and illustrated by messages (19 and 20) of FIG. 2B. As previously described, L2 I/O egress 114 uses the sequence number of message (13).

As a result of the TCP connections established, a client-side TCP connection between application proxy layer 111 and user device 150 exists and a server-side TCP connection between application proxy layer 111 and network 110 exists. L2 I/O ingress 113 and L2 I/O egress 114 may apply a delta value with respect to sequence numbers for subsequent packets, as previously described.

Although FIGS. 4A and 4B illustrate an exemplary process 400 for establishing a resilient TCP spliced connection, according to other implementations, process 400 may include additional operations, fewer operations, and/or different operations than those illustrated in FIGS. 4A and 4B, and described herein. By way of example, the order in which TCP connections are established between the first end device, the ingress, the egress, the application proxy, and the second end device may be different according to other implementations.

Figure 5:
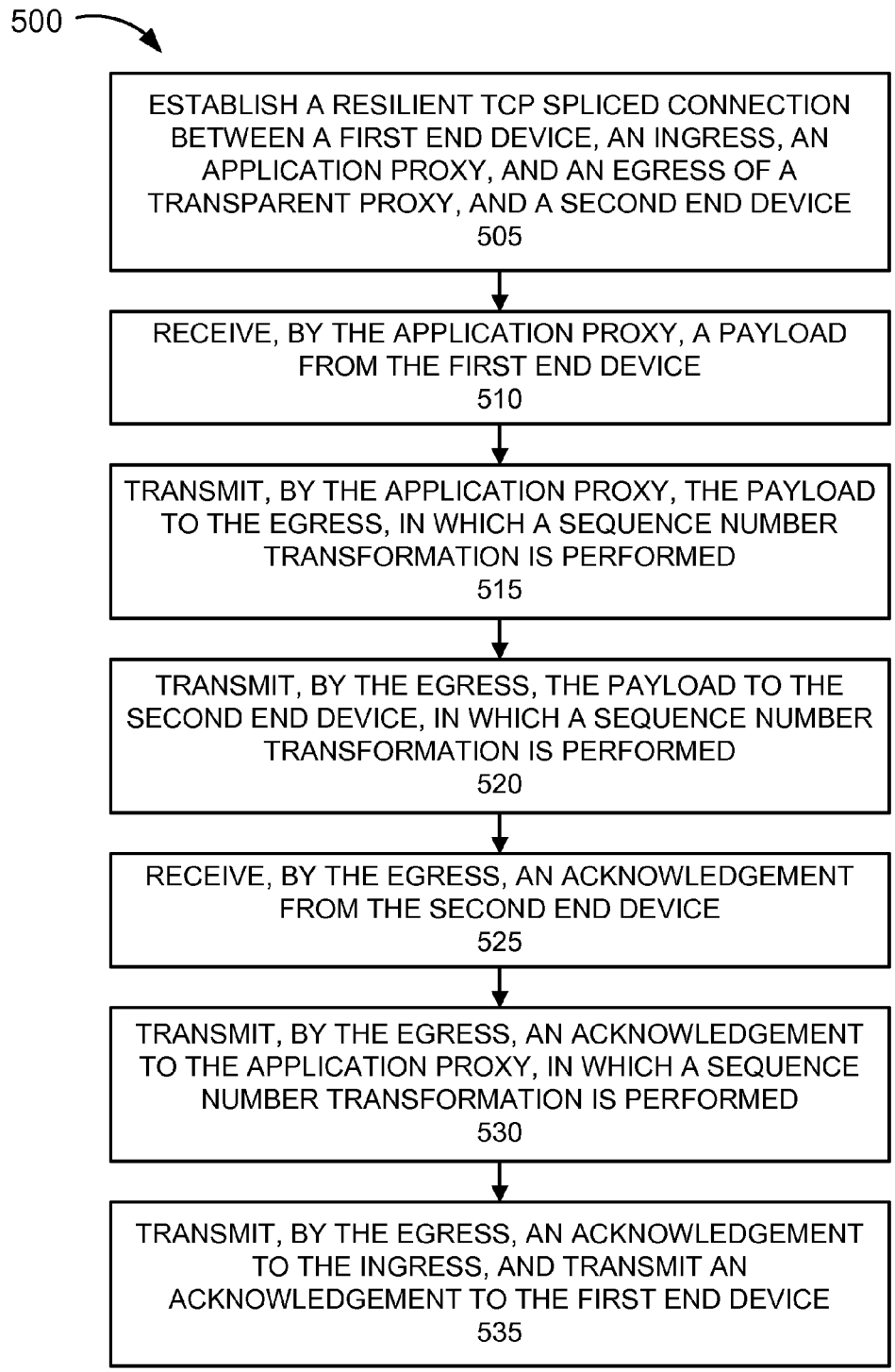
FIG. 5 is a flow diagram illustrating another exemplary process pertaining to an exemplary embodiment of the resilient TCP splicing for a proxy service.

FIG. 5 is a flow diagram illustrating another exemplary process 500 pertaining to an exemplary embodiment of the resilient TCP splicing for a proxy service. For example, process 500 pertains to the communication of packets after the resilient TCP connection has been established with transparent proxy 135. A step described in process 500 is performed by one or more of the devices illustrated in FIG. 1A. For example, the device may correspond to transparent proxy 135. The description of process 500 refers to previous figures.

Referring to FIG. 5, process 500 begins, in block 505, with establishing a resilient TCP spliced connection between a first end device, an ingress, an application proxy, and an egress of a transparent proxy, and a second end device. For example, a resilient TCP spliced connection is established according to process 400 between user device 150, L2 I/O ingress 113, application proxy layer 111, L2 I/O egress 114, and network device 110.

In block 510, a payload from the first end device is received by the application proxy. For example, user device 150 transmits via the TCP spliced connection, a packet that includes a payload, to application proxy layer 111, as previously described and illustrated by messages (21-23) of FIG. 2C.

In block 515, the payload is transmitted, by the application proxy and to the egress, in which a sequence number transformation is performed. For example, application proxy layer 111 transmits a packet that includes the payload to L2 I/O egress 114, as previously described and illustrated by message (24) of FIG. 2C.

In block 520, the payload is transmitted, by the egress and to the second end device, in which a sequence number transformation is performed. For example, L2 I/O egress 114 transmits a packet that includes the payload to network device 110 via router 125-2, as previously described and illustrated by messages (25 and 26) of FIG. 2C. In this embodiment, the sequence number transformation may include shifting the sequence number by the proxy-to-server delta.

In block 525, an acknowledgement is received, by the egress and from the second end device. For example, L2 I/O egress 114 receives an acknowledgement from network device 110 via router 125-2, as previously described and illustrated by messages (28 and 29) of FIG. 2C.

In block 530, an acknowledgement is transmitted, by the egress and to the application proxy. For example, L2 I/O egress 114 transmits an acknowledgement to an application proxy layer 111, as previously described and illustrated in message (31) of FIG. 2C.

In block 535, an acknowledgement is transmitted, by the egress and to the ingress, and the ingress transmits an acknowledgement to the first end device. For example, L2 I/O egress 114 transmits an acknowledgement to L2 I/O ingress 113, as previously described and illustrated in message (30) of FIG. 2C. As illustrated in FIG. 2C, L2 I/O ingress 113 suppresses the acknowledgement (message 27) received from application proxy layer 111 from being transmitted to user device 150 (e.g., suppress transmission of ACK message 32) until the acknowledgement (message 30) is received. In this way, the resilient TCP splicing mechanism ensures that the payload is received and acknowledged by the data receiver (e.g., network device 110). Additionally, in response to receiving the acknowledgement (message 30), L2 I/O ingress 113 transmits an acknowledgement to user device 150 via router 125-1, as previously described and illustrated by messages (32 and 33) of FIG. 2C. Message 32, for example, may include a sequence number transformation. In this embodiment, the sequence number transformation may include shifting the sequence number by the proxy-to-client delta.

Although FIG. 5 illustrates an exemplary process 500 for acknowledging payloads when a resilient TCP spliced connection is established, according to other implementations, process 500 may include additional operations, fewer operations, and/or different operations than those illustrated in FIG. 5, and described herein.

Figure 6:
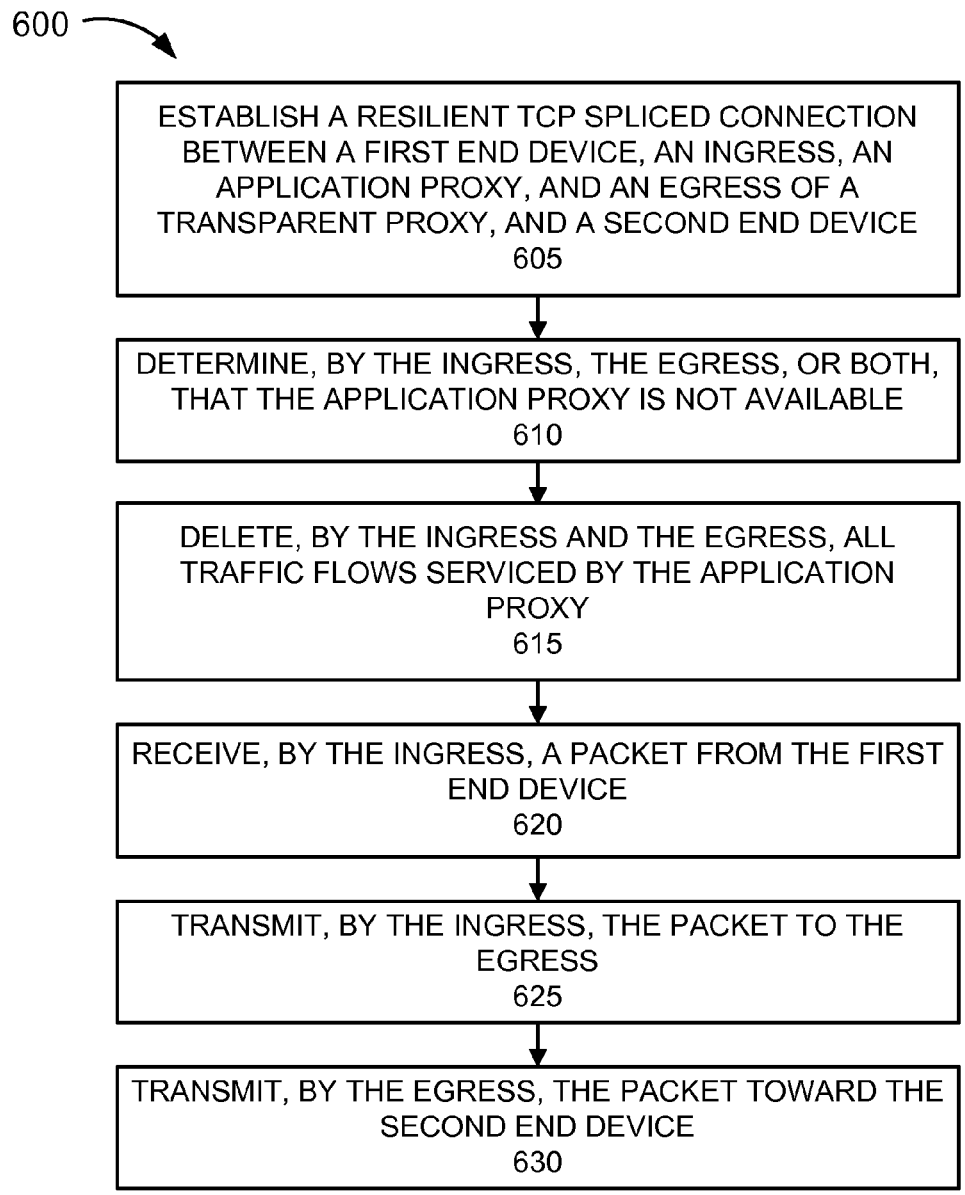
FIG. 6 is a flow diagram illustrating yet another exemplary process pertaining to an exemplary embodiment of the resilient TCP splicing for a proxy service.

FIG. 6 is a flow diagram illustrating yet another exemplary process 600 pertaining to an exemplary embodiment of the resilient TCP splicing for a proxy service. For example, process 600 pertains to the communication of packets after the resilient TCP spliced connection has been established with transparent proxy 135, but application proxy layer 111 subsequently crashes. A step described in process 600 is performed by one or more of the devices illustrated in FIG. 1A. For example, the device may correspond to transparent proxy 135. The description of process 600 refers to previous figures.

Referring to FIG. 6, process 600 begins, in block 605, with establishing a resilient TCP spliced connection between a first end device, an ingress, an application proxy, and an egress of a transparent proxy, and a second end device. For example, a resilient TCP spliced connection is established according to process 400 between user device 150, L2 I/O ingress 113, application proxy layer 111, L2 I/O egress 114, and network device 110.

In block 610, the ingress, the egress, or both determine that the application proxy is not available. For example, L2 I/O ingress 113, L2 I/O egress 114, or both determine(s) that application proxy layer 111 is not available (e.g. crashed), as previously described and illustrated in FIG. 2D.

In block 615, the ingress and the egress delete traffic flows serviced by the application proxy. For example, L2 I/O ingress 113 and L2 I/O egress 114 each delete traffic flow information from a flow table pertaining to traffic flows associated with user device 150 and network device 110 that traverse transparent proxy 135, as previously described and illustrated in FIG. 2D.

In block 620, the ingress receives a packet from the first end device. For example, L2 I/O ingress 113 receives a packet from user device 150 via router 125-1, as previously described and illustrated by messages (21 and 22) of FIG. 2D.

In block 625, the ingress transmits the packet to the egress. For example, L2 I/O ingress 113 transmits the packet to L2 I/O egress 114, as previously described and illustrated by message (23) of FIG. 2D. In this regard, the resilient TCP spliced connection including the end-to-end TCP connection between user device 150 and network device 110 is maintained despite the unavailability of application proxy layer 111.

In block 630, the egress transmits the packet toward the second end device. For example, L2 I/O egress 114 transmits the packet toward network device 110 via router 125-2, as previously described and illustrated by messages (24 and 25) of FIG. 2D. An acknowledgement from network device 110 to user device 150 may be communicated along the same path, as previously described and illustrated by messages (26-30) of FIG. 2D.

Although FIG. 6 illustrates an exemplary process 600 for sustaining the spliced TCP connection even when the application proxy crashes, according to other implementations, process 600 may include additional operations, fewer operations, and/or different operations than those illustrated in FIG. 6, and described herein.

Figure 7:
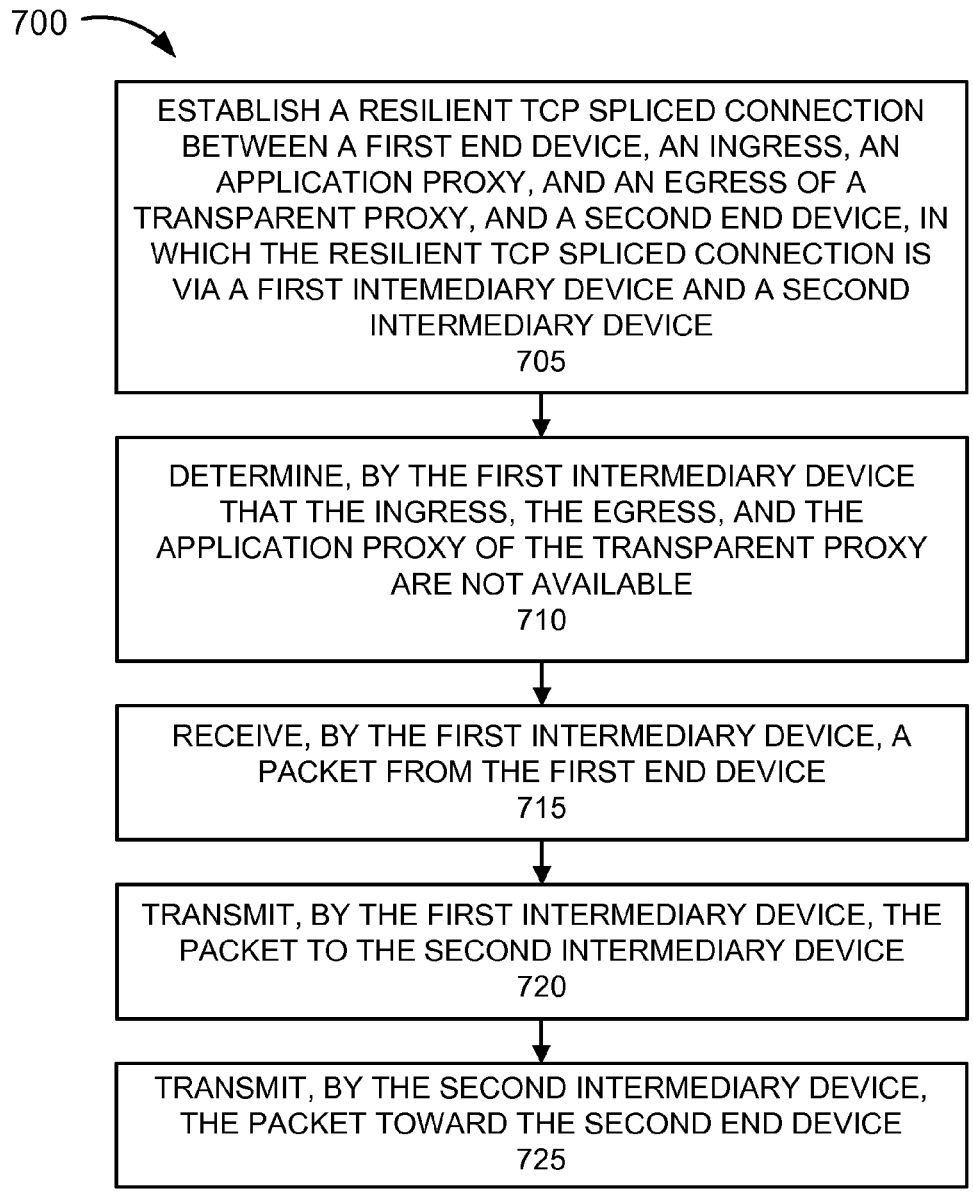
FIG. 7 is a flow diagram illustrating still another exemplary process pertaining to an exemplary embodiment of the resilient TCP splicing for a proxy service.

FIG. 7 is a flow diagram illustrating still another exemplary process 700 pertaining to an exemplary embodiment of the resilient TCP splicing for a proxy service. For example, process 700 pertains to the communication of packets after the resilient TCP spliced connection has been established with transparent proxy 135, but transparent proxy 135 subsequently crashes. A step described in process 700 is performed by one or more of the devices illustrated in FIG. 1A. For example, the device may correspond to router 125. The description of process 700 refers to previous figures.

Referring to FIG. 7, process 700 begins, in block 705, with establishing a resilient TCP spliced connection between a first end device, an ingress, an application proxy, and an egress of a transparent proxy, and a second end device. For example, a resilient TCP spliced connection is established according to process 400 between user device 150, L2 I/O ingress 113, application proxy layer 111, L2 I/O egress 114, and network device 110. Additionally, as previously described and illustrated, the resilient TCP spliced connection may include intermediary devices (e.g., routers 125).

In block 710, a first intermediary device determines that the transparent proxy is unavailable. For example, router 125-1 determines that L2 I/O ingress 113, application proxy layer 111, and L2 I/O egress 114 is not available (e.g., link failure, transparent proxy 135 is crashed, etc.), as previously described and illustrated in FIG. 2E.

In block 715, the first intermediary device receives a packet from the first end device. For example, router 125-1 receives a packet from user device 150, as previously described and illustrated by message (21) of FIG. 2E.

In block 720, the first intermediary device transmits the packet to a secondary intermediary device. For example, router 125-1 transmits the packet to router 125-2, as previously described and illustrated by message (22) of FIG. 2E.

In block 725, the second intermediary device transmits the packet toward the second end device. For example, router 125-2 transmits the packet toward network device 110, as previously described and illustrated by message (23) of FIG. 2E. An acknowledgement from network device 110 to user device 150 may be communicated along the same path, as previously described and illustrated by messages (24-26) of FIG. 2E.

Although FIG. 7 illustrates an exemplary process 700 for sustaining an end-to-end device TCP connection even when the transparent proxy crashes, according to other implementations, process 700 may include additional operations, fewer operations, and/or different operations than those illustrated in FIG. 7, and described herein.

The foregoing description of embodiments provides illustration, but is not intended to be exhaustive or to limit the embodiments to the precise form disclosed. For example, in the preceding specification, various embodiments have been described with reference to the accompanying drawings. However, various modifications and changes may be made thereto, and additional embodiments may be implemented, without departing from the broader scope of the invention as set forth in the claims that follow. For example, according to an exemplary embodiment, referring to FIG. 2B, message (16), application proxy layer 111 may select an initial sequence number for message (16) based on message (15). In this way, the sequence number included in message (18) matches the sequence number to be transmitted in message (19) so that L2 I/O egress 114 does not have to convert the sequence number. The specification and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4A, 4B, and 5-7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware or hardware. For example, a process or a function may be implemented as "logic" or as a "component." This logic or this component may include hardware (e.g., processor 305, etc.) or a combination of hardware and software (e.g., software 315). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 310. The data and/or information may be executed to perform processes or provide functions, as described herein.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   receiving, by an ingress of a transparent proxy device and from a first end device, a first request that includes a first initial sequence number and options, to establish a layer four connection with a second end device, wherein the ingress operates at a layer lower than an application layer of the transparent proxy device;
   learning, by the ingress of the transparent proxy device, the first initial sequence number of the first request;
   transmitting, by the ingress of the transparent proxy device, the first request, to an egress of the transparent proxy device, wherein the first request bypasses an application proxy of the transparent proxy device and wherein the application proxy operates at the application layer of the transparent proxy device;
   receiving, by an egress of the transparent proxy device and from the ingress, the first request, wherein the egress operates at the layer lower than the application layer of the transparent proxy device;
   learning, by the egress of the transparent proxy device, the first initial sequence number of the first request;
   receiving, by the egress of the transparent proxy device and from the second end device, a first acknowledgement for the first request and options, wherein the first acknowledgement includes a second initial sequence number;
   learning, by the egress of the transparent proxy device, the second initial sequence number;
   transmitting, by the egress of the transparent proxy device, the first acknowledgement, to the ingress of the transparent proxy device, wherein the first acknowledgement bypasses the application proxy of the transparent proxy device;
   learning, by the ingress of the transparent proxy device, the second initial sequence number;
   transmitting, by the ingress to the application proxy of the transparent proxy device, a second request, which includes the first initial sequence number and options negotiated between the first end device and the second end device, to establish a layer four connection between the ingress and the application proxy, in response to receiving the first acknowledgement;
   establishing a layer four connection between the ingress and the first end device based on a second acknowledgement from the first end device;
   establishing the layer four connection, between the ingress and the application proxy, in response to receiving the second acknowledgement;
   establishing a layer four connection between the application proxy and the egress; and
   establishing the layer four connection between the egress and the second end device based on the second acknowledgement.

2. The method of claim 1, wherein the layer four connection between the ingress and the first end device is a Transport Control Protocol (TCP) connection, and wherein an end-to-end connection between the first end device and the second end device is a TCP spliced connection via the transparent proxy device.

3. The method of claim 2, further comprising:
   detecting that the application proxy is not available;
   receiving a packet, by the ingress; and
   transmitting, by the ingress, the packet directly to the egress, without traversing the application proxy, in response to the detecting.

4. The method of claim 3, further comprising:
   storing, by each of the ingress and the egress, traffic flow information pertaining to one or more traffic flows between the first end device and the second end device via the transparent proxy device; and
   deleting, by each of the ingress and the egress, the traffic flow information in response to the detecting.

5. The method of claim 1, further comprising:
   receiving, by a first intermediary device situated between the first end device and the transparent proxy device, a packet from the first end device that is to be routed to the second end device;
   detecting that the transparent proxy device is not available;
   transmitting the packet, by the first intermediary device to a second intermediary device, wherein the second intermediary device is situated between the second end device and the transparent proxy device; and
   receiving the packet by the second end device.

6. The method of claim 1, wherein an end-to-end connection between the first end device and the second end device is a Transport Control Protocol (TCP) spliced connection via the transparent proxy device, and the method further comprises at least one of:
   transmitting, by the transparent proxy device, data packets received from the first end device, via the TCP spliced connection, to the second end device; or
   transmitting, by the transparent proxy device, data packets received from the second end device, via the TCP spliced connection, to the first end device.

7. The method of claim 1, wherein each of the layer four connections is established based on a three-way handshake exchange of messages.

8. The method of claim 1, wherein the establishing the layer four connection between the application proxy and the egress is in response to establishing the layer four connection between the ingress and the application proxy, and wherein the layer four connection between the application proxy and the egress is initiated by the application proxy.

9. A proxy device comprising:
   an ingress layer including a first transmitter and a first receiver, wherein the ingress layer operates up to a layer four communication layer;

an egress layer including a second transmitter and a second receiver, wherein the egress layer operates up to a layer four communication layer;

an application proxy, wherein the application proxy operates at an application communication layer;

a memory, wherein the memory stores instructions; and a processor, wherein the processor executes the instructions to:

receive, via the first receiver of the ingress layer and from a first end device, a first request that includes a first initial sequence number and options, to establish a layer four connection with a second end device;

learn, by the ingress layer, the first initial sequence number of the first request;

transmit, via the first transmitter of the ingress layer, the first request, to the egress layer, wherein the first request bypasses the application proxy;

receive, via the second receiver of the egress layer and from the ingress layer, the first request;

learn, by the egress layer, the first initial sequence number of the first request;

receive, via the second receiver of the egress layer and from the second end device, a first acknowledgement for the first request and options, wherein the first acknowledgement includes a second initial sequence number;

learn, by the egress layer, the second initial sequence number;

transmit, via the second transmitter of the egress layer, the first acknowledgement, to the ingress layer, wherein the first acknowledgement bypasses the application proxy;

learn, by the ingress layer, the second initial sequence number;

transmit, via the first transmitter of the ingress layer to the application proxy, a second request, which includes the first initial sequence number and options negotiated between the first end device and the second end device, to establish a layer four connection between the ingress layer and the application proxy, in response to receiving the first acknowledgement;

establish a first, layer four connection between the ingress layer and the first end device based on a second acknowledgement from the first end device;

establish a second, layer four connection, between the ingress layer and the application proxy, in response to receiving the second acknowledgement;

establish a third, layer four connection between the application proxy and the egress layer; and establish a fourth, layer four connection between the egress layer and the second end device based on the second acknowledgement.

10. The proxy device of claim 9, wherein each of the layer four connections is established based on a three-way handshake exchange of messages according to a Transport Control Protocol (TCP), and wherein the proxy device is a transparent proxy device.

11. The proxy device of claim 9, wherein the ingress layer is configured to:

transform sequence numbers of packets received from the first end device, via the first, layer four connection, to different sequence numbers; and transmit the packets having the different sequence numbers, via the second, layer four connection, to the application proxy.

12. The proxy device of claim 9, wherein the egress layer is configured to:

transform sequence numbers of packets received from the second end device, via the fourth, layer four connection, to different sequence numbers; and transmit the packets having the different sequence numbers, via the third, layer four connection, to the application proxy.

13. The proxy device of claim 9, wherein the ingress layer is configured to:

receive a first data packet, via the first, layer four connection, from the first end device;

transmit the first data packet, via the second, layer four connection, to the application proxy;

detect that the application proxy is not available;

receive a second data packet; and transmit the second data packet directly to the egress layer, without traversing the application proxy, in response to a detection that the application proxy is not available.

14. The proxy device of claim 9, wherein the egress layer is configured to:

receive a first data packet, via the fourth, layer four connection, from the second end device;

transmit the first data packet, via the third, layer four connection, to the application proxy;

detect that the application proxy is not available;

receive a second data packet; and transmit the second data packet directly to the ingress layer, without traversing the application proxy, in response to a detection that the application proxy is not available.

15. The proxy device of claim 14, wherein the egress layer is further configured to:

store traffic flow information pertaining to one or more traffic flows between the first end device and the second end device via the proxy device; and delete the traffic flow information in response to the detection, wherein the traffic flow information includes traffic flow information pertaining to the first data packet.

16. The proxy device of claim 9, wherein an end-to-end connection between the first end device and the second end device is a Transport Control Protocol (TCP) spliced connection via the proxy device, and the proxy device is configured to:

transmit data packets, via the TCP spliced connection, from the first end device to the second end device and from the second end device to the first end device, wherein the TCP spliced connection includes the second, layer four connection and the third, layer four connection.

17. A non-transitory computer-readable storage medium that stores instructions, executable by a processor of a computational device that includes an ingress layer that operates up to a layer four communication layer, an egress layer that operates up to a layer four communication layer, and an application proxy that operates at an application communication layer, which when executed cause the computational device to:

receive, by the ingress layer and from a first end device, a first request that includes a first initial sequence number and options, to establish a layer four connection with a second end device;

learn, by the ingress layer, the first initial sequence number of the first request;

transmit, by the ingress layer, the first request, to the egress layer, wherein the first request bypasses the application proxy;

receive, by the egress layer and from the ingress layer, the first request;

learn, by the egress layer, the first initial sequence number of the first request;

receive, by the egress layer and from the second end device, a first acknowledgement for the first request and options, wherein the first acknowledgement includes a second initial sequence number;

learn, by the egress layer, the second initial sequence number;

transmit, by the egress layer, the first acknowledgement, to the ingress layer, wherein the first acknowledgement bypasses the application proxy;

learn, by the ingress layer, the second initial sequence number;

transmit, by the ingress layer to the application proxy, a second request, which includes the first initial sequence number and options negotiated between the first end device and the second end device, to establish a layer four connection between the ingress layer and the application proxy, in response to receiving the first acknowledgement;

establish a first, layer four connection between the ingress layer and the first end device based on a second acknowledgement from the first end device;

establish a second, layer four connection, between the ingress layer and the application proxy, in response to receiving the second acknowledgement;

establish a third, layer four connection between the application proxy and the egress layer; and establish a fourth, layer four connection between the egress layer and the second end device based on the second acknowledgement.

18. The non-transitory computer-readable storage medium of claim 17, wherein the instructions further comprise instructions to:

receive a first data packet, via the first, layer four connection, from the first end device;

transmit the first data packet, via the second, layer four connection, to the application proxy;

detect that the application proxy is not available;

receive a second data packet; and transmit the second data packet directly to the egress layer, without traversing the application proxy, in response to a detection that the application proxy is not available.

19. The non-transitory computer-readable storage medium of claim 17, wherein the instructions further comprise instructions to:

receive a first data packet, via the fourth, layer four connection, from the second end device;

transmit the first data packet, via the third, layer four connection, to the application proxy;

detect that the application proxy is not available;

receive a second data packet; and transmit the second data packet directly to the ingress layer, without traversing the application proxy, in response to a detection that the application proxy is not available.

20. The non-transitory computer-readable storage medium of claim 17, wherein the instructions further comprise instructions to:

transform sequence numbers of packets received from the first end device, via the first, layer four connection, to different sequence numbers;

transmit the packets having the different sequence numbers, via the second, layer four connection, to the application proxy;

transform sequence numbers of packets received from the second end device, via the fourth, layer four connection, to different sequence numbers; and transmit the packets having the different sequence numbers, via the third, layer four connection, to the application proxy.

* * * * *